(12) United States Patent
Charmel

(10) Patent No.: US 7,568,564 B1
(45) Date of Patent: Aug. 4, 2009

(54) DRUM-IN-HAT TORQUE LIMITER

(75) Inventor: Djamel Charmel, South Bend, IN (US)

(73) Assignee: Robert Bosch GmbH, Stuttgart (DE)

( * ) Notice: Subject to any disclaimer, the term of this patent is extended or adjusted under 35 U.S.C. 154(b) by 820 days.

(21) Appl. No.: 11/163,753

(22) Filed: Oct. 28, 2005

(51) Int. Cl.
*F16D 51/00* (2006.01)

(52) U.S. Cl. ..................... 188/328; 188/79.64

(58) Field of Classification Search ......... 188/325–343, 188/79.64, 196; 267/70, 71
See application file for complete search history.

(56) References Cited

U.S. PATENT DOCUMENTS

| | | | |
|---|---|---|---|
| 3,384,205 A | 5/1968 | Chouings | |
| 3,552,528 A * | 1/1971 | Seip | 188/79.64 |
| 3,951,243 A * | 4/1976 | Chouings | 188/328 |
| 6,234,281 B1 | 5/2001 | Sherman, II | |
| 6,568,513 B1 | 5/2003 | Doolittle et al. | |
| 6,619,441 B2 | 9/2003 | Ring et al. | |
| 6,651,789 B1 | 11/2003 | Loken et al. | |
| 6,935,626 B2 * | 8/2005 | Champ | 267/70 |

* cited by examiner

*Primary Examiner*—Bradley T King
(74) *Attorney, Agent, or Firm*—Maginot, Moore & Beck

(57) ABSTRACT

A parking brake having first and second brake shoes with first ends that engages an anchor on a backing plate and second ends that engages an adjuster. An actuator engages the first ends of the first and second brake shoes to apply an input force to move the first and second brake shoes into engagement with a drum to oppose rotation of a drum and effect a brake application. The adjuster is defined by a plurality of spring washers encapsulated in a cup and located between a first shaft connected to the first brake shoe and a second shaft connected to the second brake shoe. The spring washers yield to a predetermined resistance force greater than a input force such that a space between the first and second brake shoes is limited to a fixed distance and as a result a braking force to set at a predetermined maximum level.

7 Claims, 3 Drawing Sheets

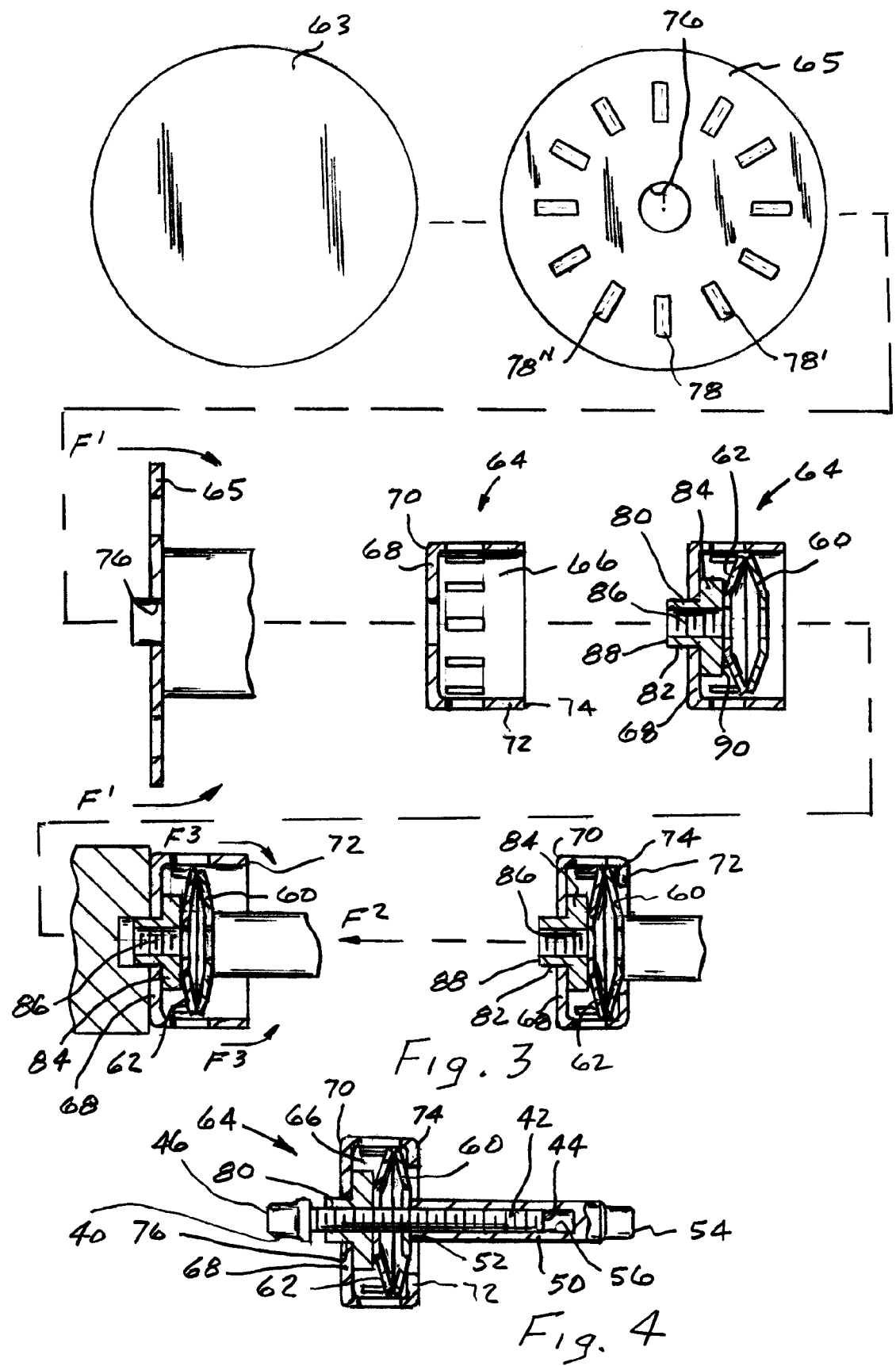

DRUM-IN-HAT TORQUE LIMITER

The present invention relates to a drum-in-hat brake system having a parking brake with a yieldable member located in an adjustor that collapses should a braking force exceed a predetermined input force.

BACKGROUND OF THE INVENTION

A wide variety of parking and service brakes are known having separate braking surfaces to effect a brake application while others employ alternate techniques for independent actuation of the service brakes and parking brake on a same brake surface of a vehicle. One of the independent braking surfaces is typically prevented from rotating by being fixed to the vehicle and another braking surface is fixed to and rotates with a vehicle wheel, for example, as in the well-known drum-in hat braking mechanisms. Also, one of the braking surfaces may be fixed to the vehicle while another is fixed to a rotatable portion which is indirectly coupled to and rotates with a vehicle wheel, for example, as in brakes employing a flexible friction band which surrounds a drum fixed to a vehicle drive shaft. In all cases, however, wheel rotation is retarded when the auxiliary brake is applied. The auxiliary brake may be hydraulically actuated, spring actuated, actuated by a mechanical coupling such as a cable, or a combination of these techniques may be employed. Mechanical actuation of the auxiliary brake may be by way of a cable, and a foot depressible pedal or hand actuated lever, or the brake may be applied automatically when a shift lever is moved to the "park" position and released when that lever is moved away from the "park" position. Other brake applying and releasing controls may be employed. Auxiliary brakes may be embodied in a completely independent form, or may share components with the normal service brakes. Component sharing typically reduces overall cost. One common technique employs the use of an operator actuable cable and linkage for independently moving the service braking surfaces into and from engagement. In this common system, an automatic service brake adjuster may be operable when braking during backing to maintain a desired brake surface running clearance. In this case, periodic adjustment of cable length is the only other adjustment required. A preferred embodiment of the present invention is used in a mechanically operable drum-in-hat auxiliary brake having an independent actuator, adjuster, and brake shoes with the only shared component being a rotor-drum assembly. The techniques of the present invention may be applied to other types of braking systems.

The desirability of limiting braking forces has been addressed in the prior art as in U.S. Pat. No. 6,619,443 that discloses an overload protection device for a truck-mounted brake assembly on a railcar. Railroad car brakes employ pneumatic as well as manual devices for applying the same brake. If the pneumatic brake system is activated and then the manual device is also actuated, the forces on the brake assembly are multiplied and brake beam deflection or failure may result. The patented arrangement provides a preloaded compression member in a chamber to absorb excess force before deflection and possible failure of the brake beam occurs.

In the highway vehicular area, force limiting has also been addressed, but in complex systems dealing with the vehicle service brakes. Antilock or anti-skid braking systems are, of course, broadly brake force limiting systems as disclosed in U.S. Pat. No. 3,384,205 wherein a drum style service brake includes a yieldable abutment that permits circumferential displacement of both the primary and secondary brake shoes. Displacement is limited by a stop whereupon further increase in the brake actuating force results in only movement of the actuating piston associated with the secondary shoe so that braking increases with a trailing shoe action.

Despite the presence of warning lights and buzzers, drivers may still occasionally forget to release the parking brake and drive away with the brake still applied. This may result in excessive wear, overheating and to permanent damage to the parking brake mechanism. In particular, an auxiliary brake such as a high gain drum-in-hat parking brake may be subject to failure when an operator drives off without releasing the park brake. Brake shoes may buckle, anchoring structures may fracture, or other damage may result.

Current safety requirements require a park brake to hold a vehicle on a 30% grade and should an operator move a vehicle without releasing the park brake damage could occur by the introduction and development of excessive braking forces into the auxiliary braking system. U.S. patent application Ser. No. 10/711,049 provides structure that limits the developed of excessive braking force should a parking brake not be released prior to driving away. This structure normally functions in an adequate manner but the components are exposed to brake dust and the environment and may be effected thereby.

SUMMARY OF THE INVENTION

The present invention provides an adjustor in a brake force limiting mechanism operative that limits a brake actuating force after reaching a predetermined level to prevent structural damage to a brake system.

The invention provides a method of manufacturing an adjuster having a yieldable member for limiting a braking force in a wheeled vehicle auxiliary brake assembly of the drum-in-hat assembly. The adjuster mechanism includes a yieldable member for reducing the space between engagement ends of first and second brake shoe webs to limit braking force to a predetermined maximum. The adjuster mechanism is defined by a cup having a tubular section with a flange on a first end and a peripheral rim on a second end. The flange has an axial opening while the tubular section has a plurality of radial slots located between the flange and a peripheral rim of the cup. A nut having a cylindrical body that extends through the axial opening in the cup until a flange thereon engages the flange on the cup has threaded axial bore that extends from a first end to a second end. A plurality of spring washers are resiliently located in the tubular section of the cup by deforming the peripheral rim into engagement with a first spring washer such that a predetermined axial force urges the flanges into frictional engagement. A first shaft has threads that extend from a first end toward a second end that are mated into the threaded axial bore of nut while the second end thereof extends past the cup while of the first end is fixed to the web of the first brake shoe. A second shaft has an axial bore that extends from a first end toward the second end with receives the first end of the first shaft and engages the first spring washer of the plurality of spring washers while a second end thereof is fixed to the web of the second brake shoe. The tubular section on being rotated correspondingly rotates the nut through the frictional engagement of the flanges to translate the nut on the threads on the first shaft and create a force that is applied through the plurality of spring washers to move the second shaft and set a spaced apart position for the first and second webs. The first and second brake shoes are moved by an input force into engagement with the braking surface to resist rotation of the wheel to effect and maintain a brake application. Should a torque be applied to rotate the wheel without the removal of the input force a resistive force is created. This resistive force is transmitted back through the first and second shafts to oppose the input force until a predetermined resistive force cause the plurality of spring washers to yield and collapse to allow as the first and second shafts move toward the cup to thereafter limit an increase in the resistive force created by the rotation of the wheel to thereafter prevent damage to the components in the drum-in-hat brake assembly.

An advantage of the present invention is that damage to a brake system caused by inadvertent failure to appropriately release the brake is eliminated or at least minimized.

A further advantage of the present invention resides in an adjuster mechanism wherein a yieldable member is encapsulated in a cup member to prevent exposure to environmental conditions that may effect functional operation thereof.

BRIEF DESCRIPTION OF THE DRAWINGS

FIG. 3 is an illustration of various steps performed in the manufacture of a cup for the adjuster mechanism of FIG. 2;

FIG. 4 is a sectional of the cup of FIG. 3 with a first shaft and a second shaft attached to the nut to define the adjuster mechanism of FIG. 2.

Corresponding reference characters indicate corresponding parts throughout the several drawing views.

DETAILED DESCRIPTION OF THE INVENTION

Figure 1:
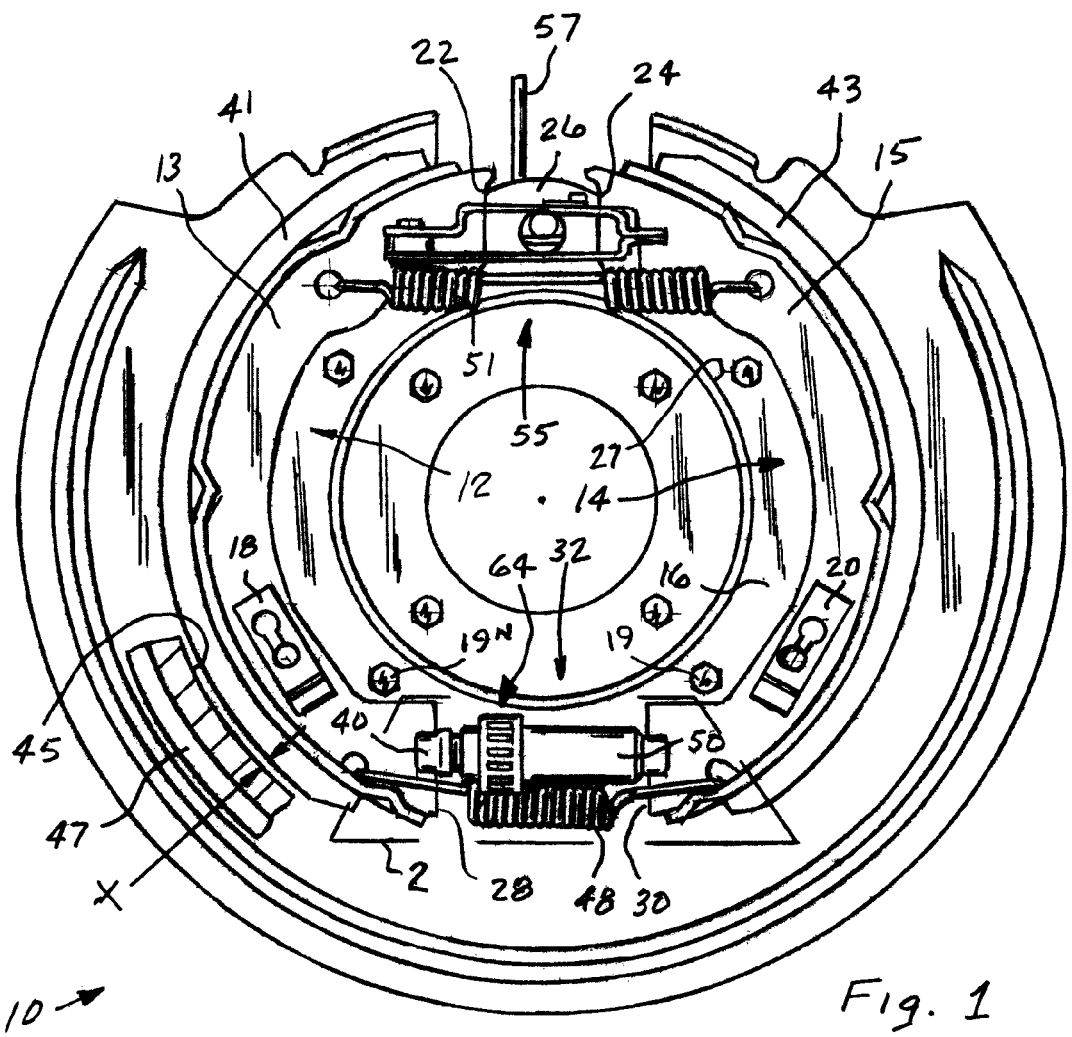
FIG. 1 is an elevation view of a drum-in-hat brake for use in a vehicle having an adjuster mechanism made according to the principals of the present invention.

FIG. 1 is an illustration of a brake assembly of a type disclosed in U.S. Pat. Nos. 6,234,281 and 6,651,789 for a wheeled vehicle having structure for hydraulic and mechanical actuation that includes the present invention. The brake assembly includes a vehicle drum-in-hat brake 10 having a first braking surface that is defined on brake shoes 12 and 14 that are retained on a backing plate 16 and a second braking surface 45 on a drum 47 that is connected to and rotates with a vehicle wheel. The mechanical operation is under the direct control of an operator through an actuator assembly 55 that receives an input applied through cable 57 to provide a brake force that moves the first and second brake surfaces together to retard rotation of the vehicle wheel and effect a brake application. The mechanical operation is most often used to effect a parking brake application but clearly may be actuated to provide a brake function in case of an emergency should a service brake fail or be inactive as cable 57 directly transmits a force or input applied by an operator to a foot pedal or lever within the vehicle. The drum-in-hat assembly 10 includes an adjuster strut mechanism 32 of the present invention that in addition to setting a braking surface running clearance is also operative upon the brake actuating force reaching a predetermined level limits a further increase in brake actuating force to prevent structural damage to the drum-in-hat assembly 10.

Referring more particularly to FIG. 1, the vehicle drum-in-hat brake 10 includes a backing plate 16 that is fixed by bolts such as 19, 19'... 19n to a vehicle. Drum 47 is attached to an axle shaft for the vehicle that passes through opening 27 in backing plate 16. The first 12 and second 14 brake shoes are retained in radial alignment on the backing plate 16 by first 18 and second 20 pins that are secured to the backing plate 16. Brake shoe 12 has a first engagement web end 22 and brake shoe 14 has a first engagement web end 24 that, respectively, contact an anchor block 26 that is fixed to the vehicle and extends through the backing plate 16. Further, brake shoe 12 has a second engagement web end 28 and brake shoe 14 has a second engagement web end 30 that, respectively, contact an adjuster strut mechanism 32. The first engagement web ends 22, 24 of the first and second webs are aligned with an actuator assembly 55 while the second engagement web ends 26, 28 on the first and second webs are spaced apart by the adjuster strut mechanism 32. The strut adjuster mechanism 32 links web 13 on brake shoe 12 with web 15 on brake shoe 14 in such a manner that a force experienced on engagement of friction pad 41 on brake shoe 12 and friction pad 43 on brake shoe 14 with frictional surface 45 on drum 47 is directly communicated to the other. The length of the adjuster strut mechanism 32 may be altered by adjusting the position of a cup 64 with respect to web ends 28,30 to establish a predetermined running clearance "X" between friction pad 41 on brake shoe 12 and second friction pad 43 on brake shoe 14, and surface 45 on drum 47. This adjustment is manual operation and needed because of wear of friction pads 41, 43 and recommended to be performed during periodic maintenance of a vehicle.

A resilient arrangement includes a first spring 51 that connects to the first brake shoe 12 with the second brake shoe 14 to respectively urge the first web ends 22, 24 toward the anchor post 26 and a second spring 48 that also connects to the first brake shoe 12 with the second brake shoe 14 to urge the second web ends 28, 30 toward the adjuster strut mechanism 32. Actuator mechanism 55 is of a type disclosed in U.S. Pat. No. 6,234,281 and is located adjacent the anchor post 26, coupled to and actuable by a park brake actuation cable 57 in the vehicle. With springs 48, 51 attached to the first 13 and second 15 webs the webs are urged toward the anchor 26, actuator assembly 55 and adjuster strut mechanism 32.

The adjuster strut mechanism 32 is defined by a first shaft 40 that is connected to a second shaft 50 through a plurality of spring washers 60, 62, see FIG. 4, that are encapsulated in a cup 64 that functions to limit a maximum braking force that may be experienced by the drum-in-hat brake 10. The adjuster strut mechanism 32 functions as a rigid coupling and while periodic brake wear adjustment may be normal to maintain a desired running clearance it also functions as a yieldable member to limit a maximum brake force any time a reactive braking force experience by the drum-in-hat brake 10 reaches a predetermined level as set by the spring force of the spring washers 60,62 in accordance with the present invention.

In more particular detail the adjuster strut mechanism 32 includes a cup 64 that has a tubular section 66 for retention of a nut 80 and spring washers 60, 62. The cup 64 has a flange 68 on a first end 70 with an axial opening 76 therein and a peripheral rim 72 on a second end 74 while the tubular section 66 has a plurality of radial slots 78, 78'... 78n that are located between the flange 68 and the peripheral rim 72 on the second end 74.

Figure 2:
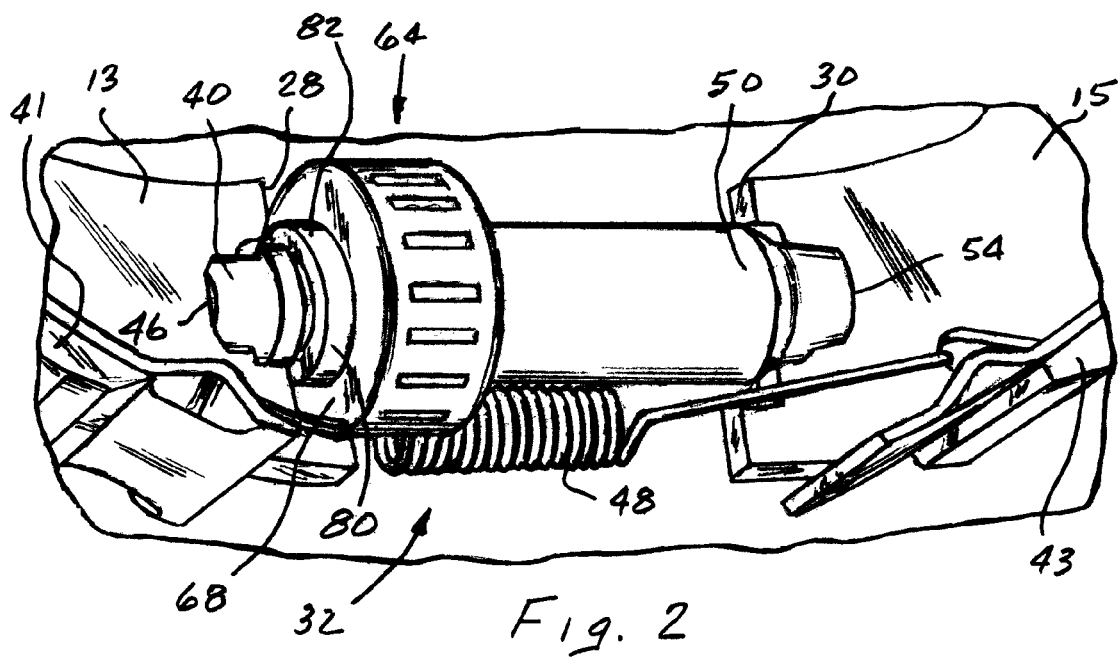
FIG. 2 is an enlarged view of the adjuster mechanism of the conscribed section 2 of FIG. 1.

The adjuster strut mechanism 32 may be manufactured through a process as illustrated in FIG. 3 through the following steps;

a solid disc 63 is obtained from a source of supply;

the solid disc 63 is placed in a fixture and blanked to remove material there from to define a formed disc 65 having an axial opening 76 surrounded by a plurality of radial slots 78, 78' . . . 78n;

the formed disc 65 is transported to a second station where a first force F1 is applied to the formed disc to produce a cup 64 having a tubular section 66 with first flange 68 with an axial opening 76 located therein while with the radial slots 78, 78' . . . 78n perpendicular to the flange 68 and located between the first end 70 and a peripheral rim 72 of the second end 74;

a nut 80 is obtained from a source and defined by a cylindrical body 82 with a flange 84 thereon and a threaded axial bore 86 that extends from a first end 88 to a second end 90;

the nut 80 is inserted into the tubular section 66 such that the end 88 of the cylindrical body 82 extends through the axial opening 76 and flange 84 is located adjacent flange 68 in the cup 64;

a plurality of spring washers 60, 62 are placed in the tubular section 66 of the cup 64;

a force F2 is applied to the spring washer 60 while flange 68 on the cup 64 is held stationary such that flange 84 resiliently engages first flange 68 with a desired frictional engagement force;

thereafter a force F3 is applied to deform the peripheral rim 72 on the second end 74 of the tubular section 66 into engagement with spring washer 60 to sustain the second force F2 and frictional engagement force between the flanges 66,84 to complete the manufacture of the cup 64 with the plurality of spring washers 60,62 encapsulated therein;

subsequently, a first shaft 40 is obtained from a source and is defined by having threads 42 that extend from a first end 44 toward a second end 46. The threads 42 are matched with the threaded axial bore 86 on nut 80 and screwed into the cup 64 until the first end 44 is positioned past the second end 72 of cup 64 as illustrated in FIG. 4;

thereafter a second shaft 50 is obtained from a source and is defined by a first end 52 and a second end 54 with a smooth axial bore 56 that extends from the first end 52 toward the second end 54 as illustrate in FIG. 4. The smooth axial bore 56 is aligned with and receives the first end 44 of the first shaft 40 such that first end 52 thereof engages spring washer 60 to complete the manufacture of the adjuster strut mechanism 32;

The adjuster strut mechanism 32 is located between webs 13 and 15 as illustrated in FIG. 2 with the second end 46 of shaft 40 being fixed from rotation with respect to web 13 by a slot therein and the second end 54 of shaft 50 being fixed from rotation with respect to web 15 by a slot therein; and A tool is inserted into a radial slot 78 in the tubular section 66 of cup 64 and a force is applied to rotate nut 80 through the frictional engagement of flanges 68,84 to translate nut 80 on threads 42 on shaft 40 such that a force is applied to the first end 52 of shaft 50 through spring washers 60,62 and as a result that second end 46 of shaft 40 and second end 54 of shaft 50 expand the adjuster strut mechanism 32 to set a running clearance "X" between a first friction pad 41 on brake shoe 12 and a second friction pad 43 on brake shoe 14, and surface 45 on drum 46.

MODE OF OPERATION

Figures 5, 6:
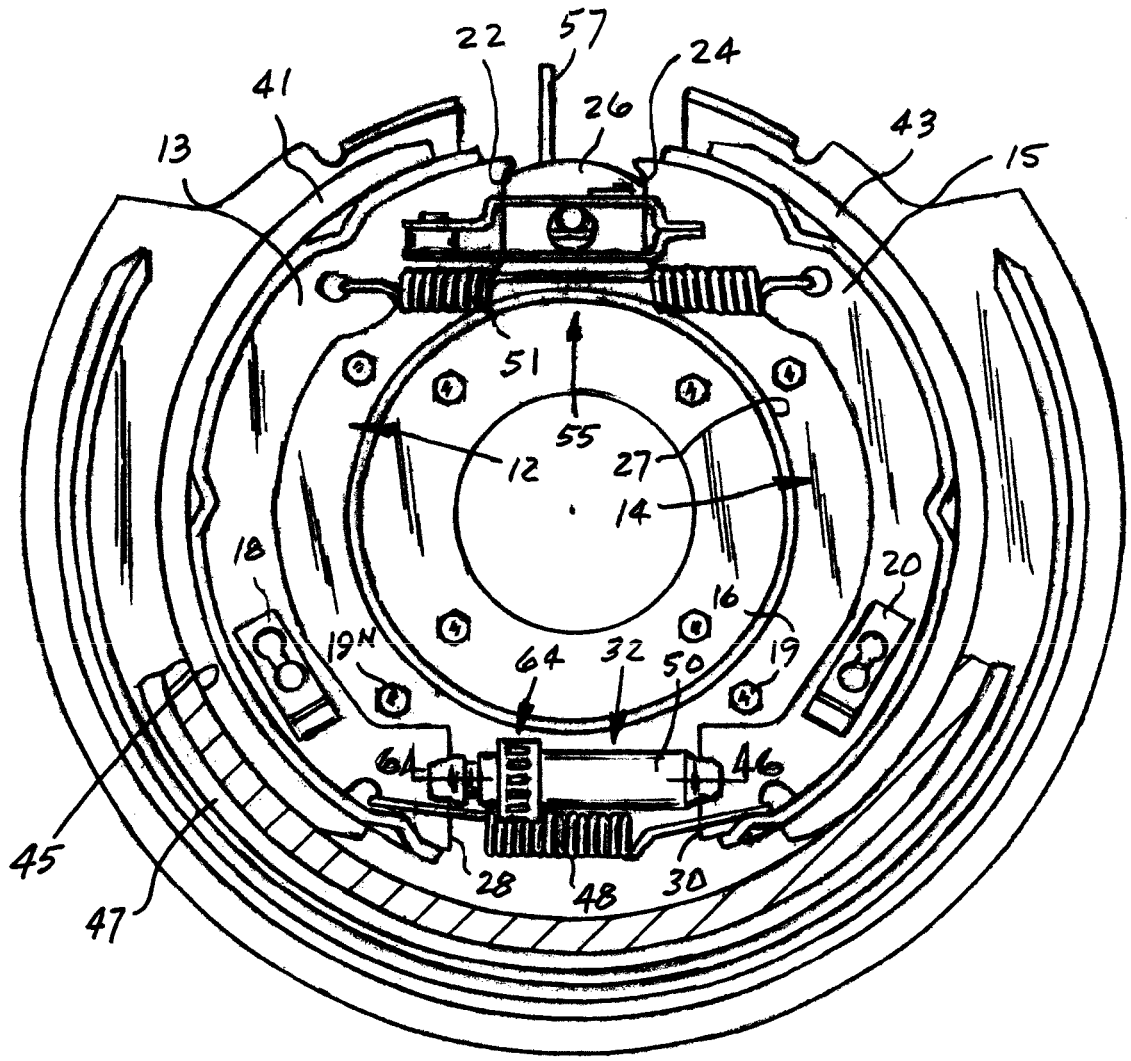
FIG. 5 is an elevation view of the drum-in-hat brake of FIG. 1 wherein an input force has moves the first and second brake shoes into engagement with a friction surface to effect a brake application.
FIG. 6 is a sectional view taken along line 6-6 of FIG. 5 illustrating the functional relationship between the plurality of spring washers and the first and second shafts when a brake force above a predetermined level is experienced in the drum-in-hat brake.

During a park brake operation, an input force from an operator is applied by cable 57 apply actuator assembly 55 and move the friction pad 41 on the first brake shoe 12 and friction pad 43 on the second brake shoes 14 into engagement with the braking surface 45 on drum 47 as shown in FIG. 5 to resist rotation of the wheel and effect a brake application. In order to maintain a parking brake application, the input force applied to cable 57 is sustained until released by an operator. Should an operator attempt to move the vehicle without releasing the input force, a torque force is introduced into the drum-in-hat brake 10 when the wheel and drum 47 are rotated by rotation of the axle of the wheel. This torque force is experienced as an additional resistive force that is transmitted into the first 40 and second 50 shafts as an opposing force to the initial braking input force. When the resistive force reaches a predetermined level, the plurality of spring washers 60, 62 yield as illustrated in FIG. 6 and the first 40 and second 50 shafts to move toward the cup 64 to limit the resistive force created by the rotation of the wheel. Thus, spring washers 60, 62 that normally bias webs 13 and 15 away from one another yield upon a braking force attaining a predetermined maximum by reducing the separation distance between the brake shoe opposite web ends 28, 30 and minimizing further increase in braking force. Once the predetermined reaction force is reached any increase may be considered to be excessive and as a remedy spring washers 60, 62 are gradually compressed to modify the excessive force until spring washers 60, 62 completely collapse.

In some applications, it may be desirable to provide shaft 50 with a flange 51 on the first end 52 to uniformly distribute the forces carried through the adjuster strut mechanism 32 to avoid damage to the spring washer 60. In any event, the adjuster strut mechanism 32 functions to limit the resistive forces that are experienced by a drum-in-hat brake 10 such damage to the various components is prevented.

What is claimed is:

1. A method of manufacturing an adjustment mechanism in a drum-in-hat park brake assembly associated with a wheel of a vehicle that includes a yieldable member that is located between a first brake shoe and a second brake shoe to limit a braking force to a predetermined maximum, comprising the steps of:

obtaining a solid disc from a source of supply;

placing said solid disc in a fixture and blanking the solid disc to remove material there from to define a formed disc having an axial opening surrounded by a plurality of radial slots;

transporting said formed disc to a second station where a first force is applied to the formed disc to produce a cup having a tubular section with first flange where the axial opening is located in a first flange and said radial slots are perpendicularly located in the tubular section between a first end and a second end;

obtaining a nut from a source, said nut having a cylindrical body with a second flange thereon and a threaded axial bore that extends from a first end to a second end;

inserting said nut into the tubular section such that the cylindrical body extends through said axial opening and said second flange is located adjacent said first flange in the cup;

placing a plurality of spring washers in said tubular section of the cup;

applying a second force to said spring washers such that said second flange resiliently engages said first flange;

deforming said second end of said tubular section into engagement with said plurality of spring washers to sustain said second force;

obtaining a first shaft from a source, said first shaft having threads that extend from a first end toward a second end;

screwing the threads on said first shaft into threads in the axial bore of said nut until said first end on the first shaft after passing through said plurality of spring washers extends past said tubular section;

obtaining a second shaft from a source, said second shaft having a second axial bore that extends from a first end toward a second end;

placing said second shaft in axial alignment with said first shaft such that said first end of the first shaft is located in said axial bore in said second shaft and said first end of said second shaft engages said plurality of spring washers;

thereafter securing said second end of said first shaft to the first brake shoe and said second end of said second shaft to the second brake shoe; and applying a third force to said tubular section to rotate said cup and translate said nut on the threads of said first shaft and move said second ends of said first and second shafts and correspondingly the first and second brake shoes toward a braking surface in said drum-in-hat assembly to define a position of rest for the first and second brake shoes with respect to the braking surface, the first and second brake shoes being moved into engagement with the braking surface by an input force to resist rotation of the wheel and effect a brake application such that when a torque is applied to rotate the wheel without removal of the input force said plurality of spring washers collapse to allow said first and second shafts to move toward said cup and thereby limit the force associated with the resistance to rotation of the wheel.

2. The method as recited in claim 1, wherein said second force as applied to said plurality of spring washers set a limit for a maximum brake force of the park brake.

3. The method as recited in claim 1 wherein the force effect of said plurality of spring washers is cumulative in setting a limit for a maximum brake force.

4. In a drum-in-hat park brake assembly for wheel of a vehicle having a first brake shoe and a second brake shoe that are respectively retained on a backing plate that is secured to the vehicle, said first brake shoe having a first web with a first engagement end and a second engagement end, said second brake shoe having a second web with a first engagement end and a second engagement end, said first engagement end of each of said first and second webs being aligned with an actuator assembly while said second engagement end of each of said first and second webs is spaced apart by an adjuster mechanism, spring means attached to said first and second webs for urging said first and second webs toward an anchor, the actuator assembly and said adjuster mechanism, said adjuster mechanism being characterized by a yieldable member for reducing the space between the second engagement end and said first and second webs to limit a braking force between the first and second shoes and a braking surface to a predetermined maximum, said adjuster mechanism being defined by a cup having a tubular section with a first flange on a first end and a peripheral rim on a second end, said first flange having an axial opening while the tubular section has a plurality of radial slots located between the first flange and the peripheral rim, a nut having a cylindrical body that extends through the axial opening in said cup until a second flange thereon engages the first flange and an axial bore with first threads therein that extends from a first end to a second end; a plurality of spring washers that are resiliently located in said tubular section by said peripheral rim being deformed into engagement with a first spring washer of said plurality of spring washers such that a predetermined axial force urges the second flange into frictional engagement with said first flange; a first shaft having second threads thereon that extend from a first end toward a second end, said second threads on said first shaft being mated into said first threads in the axial bore in said nut while said second end of the first shaft is fixed to said first web and a second shaft having a first end and a second end with a second axial bore that extends from the first end toward the second end, said second axial bore receiving said first end of said first shaft such that said first end of said second shaft engages said plurality of spring washers and said second end of said second shaft is fixed to said second web, said tubular section of said adjuster on being rotated correspondingly rotates said nut through the frictional engagement of said first flange with said second flange to translate the nut on said first shaft as the first threads rotated on the second threads as a force is applied through said plurality of spring washers moves said second shaft to set a spaced apart position for said first and second webs, the first and second brake shoes being moved by an input force into engagement with the braking surface to resist rotation of the wheel effecting a brake application and when a torque is applied to rotate the wheel without the removal of the input force a resistive force is created and transmitted back through the first and second shafts to oppose the input force until a predetermined resistive force causing the plurality of spring washers to collapse and thereafter allow said first and second shafts to move toward said cup to limit the resistive force created by the rotation of the wheel.

5. The drum-in-hat brake as recited in claim 4 wherein the resistive force required to collapse said plurality of spring washers is equal to a cumulative force of the plurality of spring washers and sets a limit for the maximum braking of a wheel.

6. The drum-in-hat brake as recited in claim 5 wherein the rotation of the tubular section of said cup is a function of the spring force of said plurality of spring washers.

7. The drum-in-hat brake as recited in claim 6 wherein said first end of said second shaft has a third flange thereon that engages said first spring washer to transmit the resistive force into the plurality of spring washers.

\* \* \* \* \*

UNITED STATES PATENT AND TRADEMARK OFFICE
CERTIFICATE OF CORRECTION

PATENT NO.        : 7,568,564 B1
APPLICATION NO.   : 11/163753
DATED             : August 4, 2009
INVENTOR(S)       : Charmat Page 1 of 1

It is certified that error appears in the above-identified patent and that said Letters Patent is hereby corrected as shown below:

On Title Page Item (75) and Item (12)

Please delete "Djamel Charmel" and insert --Djamel Charmat-- in its place.

Signed and Sealed this

Twenty-seventh Day of October, 2009

David J. Kappos
*Director of the United States Patent and Trademark Office*